W. H. KETLER.
COOKING AND HEATING ATTACHMENT FOR GAS JETS.
APPLICATION FILED MAR. 6, 1917.
1,271,583.
Patented July 9, 1918.
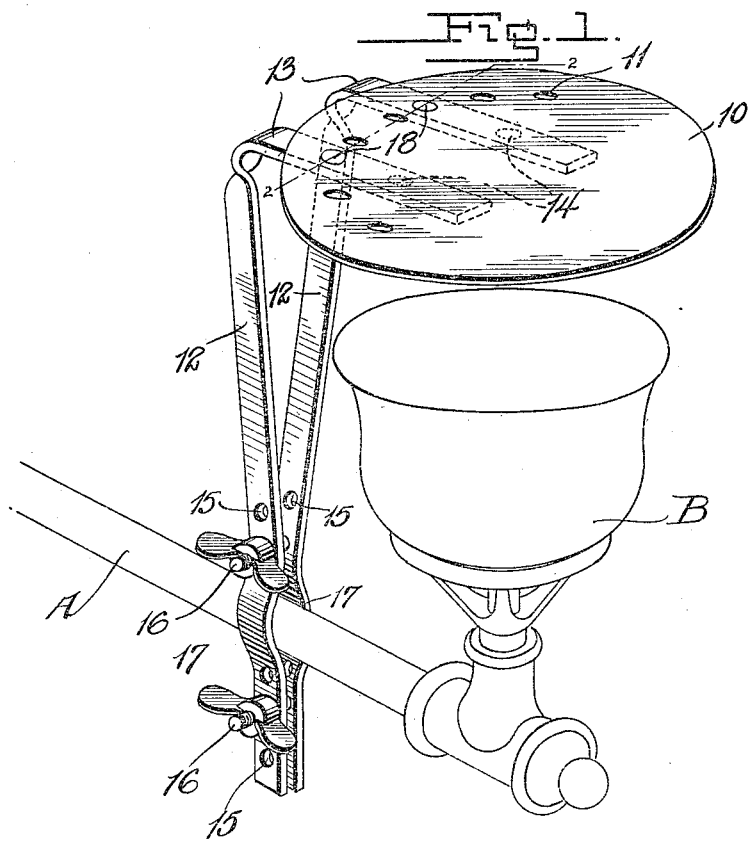
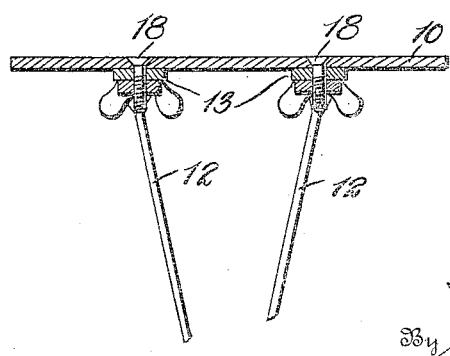
Inventor
William H. Ketler

UNITED STATES PATENT OFFICE.

WILLIAM H. KETLER, OF CAMDEN, NEW JERSEY.

COOKING AND HEATING ATTACHMENT FOR GAS-JETS.

1,271,583.  Specification of Letters Patent.  Patented July 9, 1918.

Application filed March 6, 1917. Serial No. 152,860.

*To all whom it may concern:*

Be it known that I, WILLIAM H. KETLER, a citizen of the United States, and a resident of Camden, in the county of Camden and State of New Jersey, have invented a certain new and useful Improvement in Cooking and Heating Attachments for Gas-Jets, of which the following is a specification.

The present invention relates to cooking and heating devices, and has particular reference to an attachment adapted for application to gas jets and the like.

An object of the present invention is to provide a light, simple and economically constructed commodity in the form of a heater and cooker adapted to be applied to the supply pipe of a gas jet, or the like, for heating the room, and for heating and cooking purposes by the use of relatively light, small utensils.

Another object of the present invention is to provide a device which may be easily positioned and removed without disturbing the globe, mantle or other lighting fixture, and which may be clamped upon feed pipes of various thicknesses.

The invention further aims at the provision of a body plate or disk adapted to be held over the flame of the gas jet, and to provide a bracket for supporting the plate at various heights, and in various ways to accommodate the device to gas fixtures of various types.

The above, and various other objects and advantages of this invention will be in part described, and in part understood, from the following detailed description of the present preferred embodiment, the same being illustrated in the accompanying drawing wherein:

Figure 1 is a perspective view of a heating and cooking attachment applied to a gas jet and constructed according to the present invention.

Fig. 2 is a transverse section through the device on the line 2—2 of Fig. 1, showing one means and manner of attaching the body plate to the bracket.

Referring to this drawing, 10 designates the disk or body plate which may be of any suitable form and thickness, and which is preferably made of sheet iron. This plate or disk 10 is provided with a plurality of openings 11 therethrough, preferably arranged in a circular row adjacent the peripheral edge of the plate.

The plate 10 is supported by means of a bracket, the same comprising a pair of arms 12. The arms 12 are preferably in the form of spring-steel strips, although other material may be used. Each arm 12 is provided with an edgewise extending flat finger or projection 13 formed by twisting and curving the upper end of each arm, as shown in Fig. 1. Each finger 13 is provided with one or more perforations 14 adapted to register with the openings 11 in the plate 10, one at a time.

The opposite ends of the arms 12 are provided with corresponding series of openings 15 adapted to register, and through which one or more clamping bolts 16 may be secured. The clamping bolts are provided with winged nuts or the like by means of which the same may be tightened and loosened.

The fingers 13 are of sufficient length, and are so formed as to engage across the under surface of the plate or disk 10 and thus support the same and prevent the warping or bulging downwardly of the plate when subjected to heat and the weight of the utensils or the like which may be placed on top of the plate. The openings 11 in the plate accommodate the fingers or projections 13 in various desired arrangements.

Preferably, the arms 12 are bowed outwardly, as at 17, adjacent to their outer ends and intermediate the rows of openings 15, to form a socket between the arms, and the bolts 16 are preferably two in number, one located at each end of the socket. The fingers 13 are adjustably secured to the plate 10 by means of clamping bolts 18 which are removable from the plate 10 and from the arms or fingers 13.

In Fig. 1 of the drawing, the bracket is disclosed as being applied to a gas-supply pipe A provided upon its outer end with a lighting fixture B. The bracket arms 12 are engaged, one against each side of the pipe A and the latter is fitted in the socket between the bowed portions 17 of the arms. The bolts 16 are arranged above and below the pipe A to clamp the bracket rigidly thereto. It is readily appreciated that the bracket may be applied to pipes A of various diameters, and that one or both of the bolts 16 may be removed from the arms in order to pass the latter about the opposite sides of the pipe A for securing the brackets thereto without disturbing the lighting fixture B.

By adjusting the bolts 16 in various of the openings 15, it is readily seen that the bracket arms may be raised or lowered upon pipe A, and that as the bolts 16 are relatively long, the lower ends of the arms 12 may be clamped upon the pipe A even though the bowed portions 17 do not register therewith. The bracket arms 12 are so placed upon the pipe A that the fingers 13 extend outwardly over the lighting fixture B. The plate 10 is secured upon the fingers with the outer extremities of the latter beneath the intermediate portion of the plate to support the latter. The upper ends of the arms 12 are preferably diverged in order to engage the plate 10 at suitably spaced-apart points to afford a firm purchase on the plate and to properly support it. The arms 12 are also of relatively thick inherently stiff material to support considerable weight which is placed upon the plate 10.

If the device is to be used for heating the room, it is secured in the manner shown in Fig. 1, over the lighting fixture B. The heat rising through the lighting fixture, and about the same, is diffused through the room and is thus spread throughout a relatively great area.

In using the device for cooking purposes, a light utensil may be placed upon the upper face of the plate 10 and supported thereby, and the heat rising from the lighting fixture B is sufficient to thoroughly heat the plate 10 and the utensil.

It is of course understood that the bracket arms 12 may be adjusted in various other positions than as shown in the drawing, and that various changes in form thereof may be made without departing from the spirit of this invention, and being restricted only by the scope of the following claims.

I claim:—

1. In a heater and cooker for attachment to gas jets, the combination of a plate, a pair of independent bracket arms, means for detachably clamping the bracket arms in spaced relation to the opposite sides of the gas jet, and adjustable fastening means for securing the bracket arms in various spaced apart positions upon the plate.

2. In a heater and cooker for attachment to gas jets, the combination of a plate, a pair of independent bracket arms provided with laterally turned fingers for securement against the underside of the plate to support the same, and means carried by said bracket arms for clamping the same against the opposite sides of a gas jet.

3. In a heater and cooker for attachment to a gas jet, the combination of a plate, a pair of bracket arms provided with laterally extending fingers at one end for engagement beneath the plate, means for adjustably securing the said fingers to the plate, and attaching means carried upon the opposite ends of said arms for binding the same in adjusted position upon the gas jet.

4. In a heater and cooker for attachment to gas jets and the like, the combination of a pair of bracket arms provided with corresponding series of openings in their lower ends, an adjustable clamping bolt engaging in said series of openings of the arms, one pair at a time, to bind the arms in adjusted position upon the gas jet, the upper ends of said bracket arms being bent laterally to provide supporting fingers, and a plate adjustably secured upon said supporting fingers.

5. In a heater and cooker, the combination of a plate provided with spaced-apart openings therein, a pair of independent bracket arms, one end of each arm being bent laterally to provide a supporting finger, securing bolts detachably and adjustably engaging through said fingers and through the openings in said plate one at a time to adjustably connect the fingers to the plate, the opposite ends of said clamping arms having registering outwardly and oppositely bowed socket portions adapted to receive a support therebetween, and clamping bolts arranged through said opposite ends of the arms at the opposite sides of the socket portions to bind the latter upon said support.

WILLIAM H. KETLER.

Copies of this patent may be obtained for five cents each, by addressing the "Commissioner of Patents, Washington, D. C."